(12) United States Patent
Shin

(10) Patent No.: US 8,447,647 B2
(45) Date of Patent: May 21, 2013

(54) DISCOUNT PAYMENT METHOD AND SYSTEM USING A TEMPORARY CARD NUMBER

(75) Inventor: Ji-Hoon Shin, Gyeong-gi-do (KR)

(73) Assignee: SK Planet Co., Ltd. (KR)

( * ) Notice: Subject to any disclaimer, the term of this patent is extended or adjusted under 35 U.S.C. 154(b) by 40 days.

(21) Appl. No.: 11/917,159

(22) PCT Filed: Jul. 25, 2007

(86) PCT No.: PCT/KR2007/003567
§ 371 (c)(1),
(2), (4) Date: Dec. 11, 2007

(87) PCT Pub. No.: WO2008/102935
PCT Pub. Date: Aug. 28, 2008

(65) Prior Publication Data
US 2011/0078079 A1     Mar. 31, 2011

(30) Foreign Application Priority Data

Feb. 23, 2007     (KR) .................. 10-2007-0018603

(51) Int. Cl.
*G06Q 30/00* (2006.01)
(52) U.S. Cl.
USPC .................. 705/14; 705/14.25; 705/14.64
(58) Field of Classification Search
USPC ..................... 705/44, 14.64, 14.25
See application file for complete search history.

(56) References Cited

U.S. PATENT DOCUMENTS

| 2002/0091569 A1 | 7/2002 | Kitaura et al. |
| 2005/0075932 A1* | 4/2005 | Mankoff ........................ 705/14 |
| 2008/0255942 A1* | 10/2008 | Craft ............................... 705/14 |
| 2010/0106589 A1* | 4/2010 | Etheredge et al. ......... 705/14.25 |
| 2010/0138303 A1* | 6/2010 | Preston et al. ............. 705/14.64 |

FOREIGN PATENT DOCUMENTS

| KR | 10-2001-0112546 | 12/2001 |
| KR | 10-2005-0070874 | 7/2005 |
| KR | 10-2005-0119923 | 12/2005 |
| KR | 10-2006-0108845 | 10/2006 |
| WO | 00/39657 | 7/2000 |

* cited by examiner

*Primary Examiner* — Samica L Norman
(74) *Attorney, Agent, or Firm* — Baker Hostetler LLC

(57) ABSTRACT

Disclosed is a method and system for making payment with discounted prices using temporary card numbers and temporary card number issue information including at least the discount location selected by a user, discount medium and payment medium. The user's mobile terminal transmits the temporary card number issue information to a temporary card number issue device for generating a temporary card number with the temporary card number information and transmitting the selected temporary card number to the mobile terminal for transmitting the generated temporary card number and temporary card number issue information to a credit authorization terminal (CAT) to request transaction authorization to approve payment of the transacted price less a calculated discount based on the temporary card issue information subject to the proviso that the payment authorization is requested within a predetermined time following the issuance of the temporary card as the temporary card is voided.

10 Claims, 2 Drawing Sheets

DISCOUNT PAYMENT METHOD AND SYSTEM USING A TEMPORARY CARD NUMBER

FIELD OF THE INVENTION

The present invention relates to a method and system for making payment with a discounted price based on a location by using a temporary card number, and particularly to a method and system for more conveniently making payment with a discounted price by using a coupon, wherein a means for discounting the price such as the coupon or a point is systematically managed or provided.

BACKGROUND OF THE INVENTION

In order to make payment with a discounted price by using coupons or points at an offline store, a consumer should download a mobile coupon to a mobile terminal or print a paper coupon to show the coupon at the offline store.

Recently, sellers have tended to actively utilize coupons due to the advertisement effect and consumer temptation effect of coupons, so coupon issuance is increasing. In this case, it is getting very difficult for consumers to individually handle the various coupons issued by sellers and appropriately use the coupons where necessary. Thus, it is necessary to systematically manage the coupons.

Additionally, double payment processes are required to make payment by using coupons. In other words, the amount discounted by the coupons should be first checked or paid, and the remainder should be paid again by means for making payment such as credit cards. In this regard, since the process of handling discount information such as coupons and the process of making payment for the remainder should be individually performed, it is complicated to make payment by using coupons. Furthermore, if a payment is made by using coupons, it takes more time to purchase goods, in comparison with the case where coupons are not used.

DISCLOSURE OF THE INVENTION

Technical Object

The present invention is provided to overcome the foregoing stated problem which the prior art contains. It is the object of the present invention to provide a method and system for simultaneously performing both processes of discounting the price by using coupons and paying remainder, thereby resolving the disadvantages that all coupons should be downloaded to a mobile terminal or actual coupons such as papers should always be carried to discount the price at offline stores.

It is another object of the present invention to provide a method and system for performing at one time the process conventionally requiring two steps, i.e., the steps of inputting discount information and then requesting credit card approval, wherein coupons are managed and provided based on a location, and credit card numbers and the information on a discount means such as coupons are configured into one information so that the information can be at a time transmitted to a credit authorization terminal (CAT).

It is yet another object of the present invention to provide a method for making payment with discounted prices by using temporary card numbers, the method comprising the steps of: (a) at least one discount means being selected by a user of a mobile terminal, and the mobile terminal transmitting temporary card number issue information including the selected discount means to a temporary card number issue device, wherein the mobile terminal in advance stores a plurality of discount means that can substantially discount a transacted price; (b) the temporary card number issue device selecting and storing temporary card numbers corresponding to the temporary card number issue information and transmitting the selected temporary card numbers to the mobile terminal; (c) the mobile terminal transmitting payment information including the temporary card numbers and payment means information including information on a payment means for paying the transacted price to a credit authorization terminal (CAT) if a payment request is received from the user only for a predetermined time period from when the temporary card numbers are received, and extinguishing the temporary card numbers after the predetermined time period from when the temporary card numbers are received; and (d) the CAT receiving the payment information from the mobile terminal, transmitting a request for a transaction authorization to the payment company server by using the payment information, and receiving the transaction authorization from the payment company server.

Technical Resolution

In order to achieve the object of the present invention from the first viewpoint, a method for making payment with discounted prices by using temporary card numbers comprises the steps of: (a) at least one discount means being selected by a user of a mobile terminal, and the mobile terminal transmitting temporary card number issue information including the selected discount means to a temporary card number issue device, wherein the mobile terminal in advance stores a plurality of discount means that can substantially discount a transacted price; (b) the temporary card number issue device selecting and storing temporary card numbers corresponding to the temporary card number issue information and transmitting the selected temporary card numbers to the mobile terminal; (c) the mobile terminal transmitting payment information including the temporary card numbers and payment means information including information on a payment means for paying the transacted price to a credit authorization terminal (CAT) if a payment request is received from the user only for a predetermined time period from when the temporary card numbers are received, and extinguishing the temporary card numbers after the predetermined time period from when the temporary card numbers are received; and (d) the CAT receiving the payment information from the mobile terminal, transmitting a request for a transaction authorization to the payment company server by using the payment information, and receiving the transaction authorization from the payment company server.

The discount means is a discount medium which may comprise coupons, points, mileage, and cyber cash to be used for discounting the payment due.

The temporary card number issue information may comprise the selected discount means, information on a user of the mobile terminal, and transaction information, and temporary card number management database, which the temporary card number issue device stores, may comprise temporary card numbers, telephone numbers of the user, residence registration numbers, a discounted amount, a payment amount, a transaction date, a store code, and a discount means code.

The payment means is a payment medium which may comprise a credit card, a debit card, and electronic money to be used for making payment.

In the step of (d), the CAT may further receive settlement information including discount information, in addition to the transaction authorization from the payment company server.

In order to achieve the object of the present invention from the second viewpoint, a method for making payment with discounted prices by using temporary card numbers comprises the steps of: a mobile terminal receiving location information of the mobile terminal from a location information system and transmitting a request for a location-based discount means including the location information to a discount means management device which manages the discount means that can substantially discount a transacted price; (b) the discount means management device transmitting at least one discount means of at least one store corresponding to the location information to the mobile terminal in response to the request for the location-based discount means; (c) the mobile terminal displaying the received discount means for a user of the mobile terminal to select at least one discount means, and transmitting to the temporary card number issue device temporary card number issue information which is necessary for issuing temporary card numbers and includes the selected discount means; (d) the temporary card number issue device selecting and storing temporary card numbers corresponding to the temporary card number issue information, and transmitting the selected temporary card numbers to the mobile terminal; (e) the mobile terminal transmitting payment information including the temporary card numbers and payment means information including information on a payment means for paying the transacted price to a credit authorization terminal (CAT) if a payment request is received from the user only for a predetermined time period from when the temporary card numbers are received, and extinguishing the temporary card numbers after the predetermined time period from when the temporary card numbers are received; and (f) the CAT receiving the payment information from the mobile terminal, transmitting a request for authorization of a transaction to the payment company server by using the payment information, and receiving the authorization of the transaction from the payment company server.

The location information system may comprise a location information provision system based on a base station, a Global Positioning System (GPS) system, and a sensor network.

The discount means may comprise coupons, points, mileage, and cyber cash.

The discount means management device may comprise a location-based discount means manager and a location-based discount means database, and the location-based discount means database may store and manage database of information on stores for each region and database of information on a discount means for each store.

The database of information on stores for each region may comprise a region code, a store code, store contact information, and information on whether the discount means is valid, and the database of information on a discount means for each store may comprise a store code, a discount means code, a validity period of the discount means, a title of the discount means, and a discounted amount.

The temporary card number issue information may comprise the selected location-based discount means, information on a user of the mobile terminal, and transaction information, and a temporary card number management database which the temporary card number issue device stores may comprise temporary card numbers, telephone numbers of the user, residence registration numbers, a discounted amount, a payment amount, a transaction date, a store code, and a discount means code.

The payment means may comprise a credit card, a debit card, and electronic money.

In the step of (f), the CAT may further receive settlement information including discount information, in addition to the transaction authorization from the payment company server.

In order to achieve the object of the present invention from the third viewpoint, a system for making payment with discounted prices by using temporary card numbers comprises: a mobile terminal which a consumer uses; a temporary card number issue device for issuing temporary card numbers; a credit authorization terminal (CAT) which a seller uses; and a payment company server for performing a transaction authorization, wherein at least one discount means is selected by a user of the mobile terminal, the mobile terminal in advance storing a plurality of discount means that can substantially discount a transacted price, and the mobile terminal transmits temporary card number issue information including the selected discount means to the temporary card number issue device, receives the temporary card numbers from the temporary card number issue device, transmits payment information including the temporary card numbers and payment means information including information on a payment means for paying the transacted price to a credit authorization terminal (CAT) if a payment request is received from the user only for a predetermined time period from when the temporary card numbers are received, and extinguishes the temporary card numbers after the predetermined time period from when the temporary card numbers are received, wherein the temporary card number issue device selects and stores temporary card numbers corresponding to the temporary card number issue information, and transmits the selected temporary card numbers to the mobile terminal, and wherein the CAT receives the payment information from the mobile terminal, transmits a request for a transaction authorization to the payment company server by using the payment information, and receives the transaction authorization from the payment company server.

The discount means may comprise coupons, points, mileage, and cyber cash.

The payment means may comprise a credit card, a debit card, and electronic money.

The temporary card number issue information comprises the selected discount means, information on a user of the mobile terminal, and transaction information, and a temporary card number management database which the temporary card number issue device includes comprises temporary card numbers, telephone numbers of the user, residence registration numbers, a discounted amount, a payment amount, a transaction date, a store code, and a discount means code.

The CAT may further receive the settlement information including discount information in addition to the transaction authorization from the payment company server.

In order to achieve the object of the present invention from the fourth viewpoint, a system for making payment with discounted prices by using temporary card numbers comprises: a mobile terminal which a consumer uses; a location information system for generating location information of the mobile terminal to provide the generated location information to the mobile terminal; a discount means management device for managing a discount means that can substantially discount a transacted price; a temporary card number issue device for issuing temporary card numbers; a credit authorization terminal (CAT) which a seller uses; and a payment company server for performing a transaction authorization, wherein the mobile terminal requests for a location-based discount means including location information of the mobile terminal to the discount means management device, receives at least one location-based discount means from the discount means management device, at least one discount means among the location-based discount means is selected by a user of the mobile terminal, the mobile terminal transmits temporary card number issue information including the selected discount means to the temporary card number issue device, receives the temporary card numbers from the temporary card number issue device, transmits payment information including the temporary card numbers and payment means information including information on a payment means for paying the transacted price to a credit authorization terminal (CAT) if a payment request is received from the user only for a predetermined time period from when the temporary card numbers are received, and extinguishes the temporary card numbers after the predetermined time period from when the temporary card numbers are received, wherein the discount means management device transmits at least one location-based discount means of at least one store corresponding to the location information to the mobile terminal in response to the request for the location-based discount means of the mobile terminal, wherein the temporary card number issue device selects and stores temporary card numbers corresponding to the temporary card number issue information, and transmits the selected temporary card numbers to the mobile terminal, and wherein the CAT receives the payment information from the mobile terminal, transmits a request for a transaction authorization to the payment company server by using the payment information, and receives the transaction authorization from the payment company server.

The location information system may comprise a location information provision system based on a base station, a Global Positioning System (GPS) system, and a sensor network.

The discount means may comprise coupons, points, mileage, and cyber cash.

The discount means management device may comprise a location-based discount means manager and a location-based discount means database, and the location-based discount means database includes database of information on stores for each region and database of information on a discount means for each store.

The database of information on stores for each region may comprise a region code, a store code, store contact information, and information on whether the discount means is valid, and the database of information on a discount means for each store may comprise a store code, a discount means code, a validity period of the discount means, a title of the discount means, and a discounted amount.

The temporary card number issue information may comprise the selected discount means, information on a user of the mobile terminal, and transaction information, and a temporary card number management database which the temporary card number issue device stores may comprise temporary card numbers, telephone numbers of the user, residence registration numbers, a discounted amount, a payment amount, a transaction date, a store code, and a discount means code.

The payment means may comprise a credit card, a debit card, and electronic money.

The CAT may further receive settlement information including discount information in addition to the authorization of the transaction from the payment company server.

BRIEF DESCRIPTION OF THE DRAWINGS

The above aspects and features of the present invention will become more apparent by describing certain embodiments of the present invention with reference to the accompanying drawings, in which.

EXEMPLARY EMBODIMENT OF THE PRESENT INVENTION

Exemplary embodiments of the present invention will be described in detail with reference to the annexed drawings. In the following description, detailed descriptions of known functions and configurations incorporated herein have been omitted for conciseness and clarity.

Figure 1:
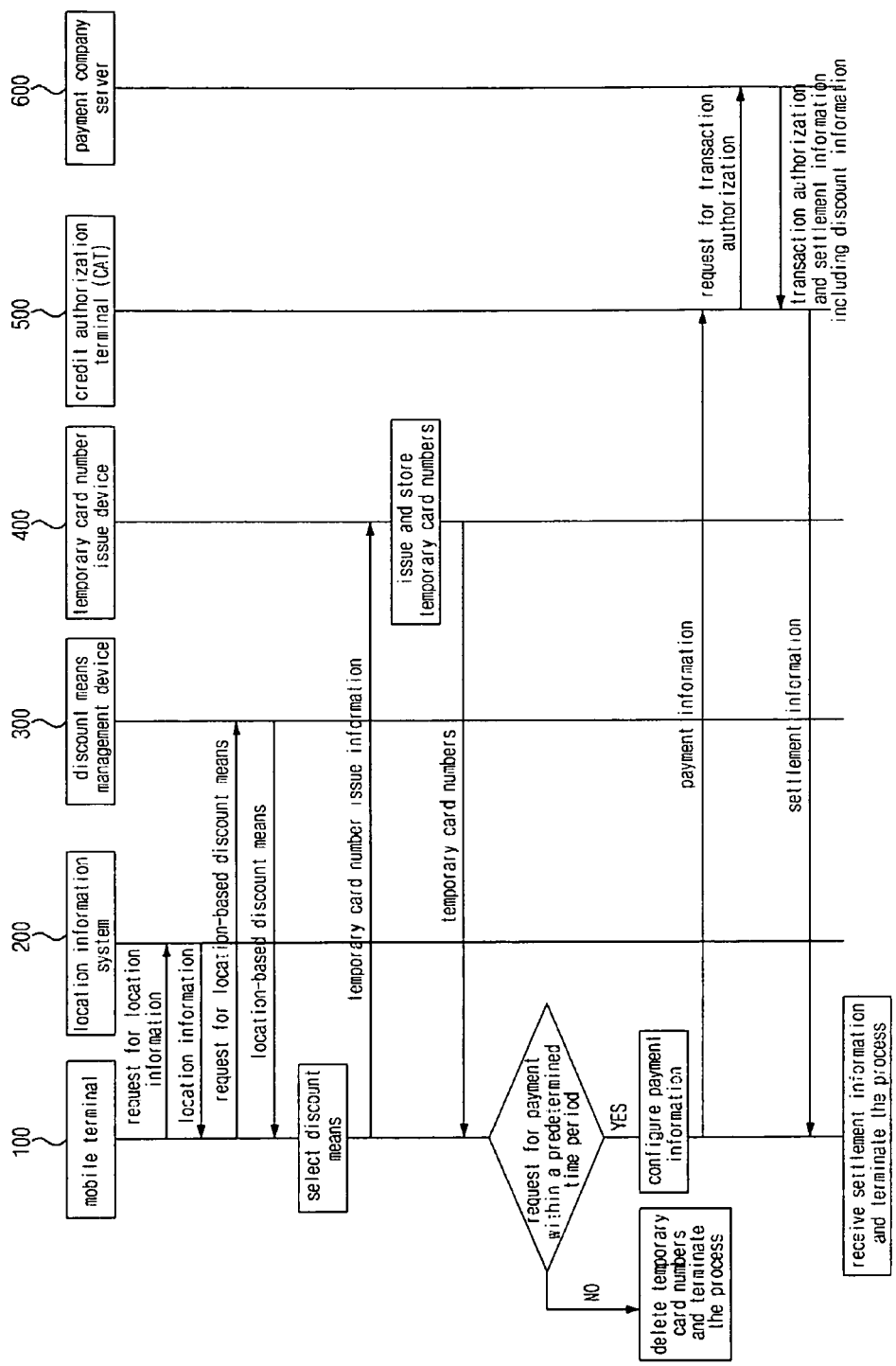
FIG. 1 is a flow chart for explaining a method of making payment with discounted price based on a location by using temporary card numbers according to an embodiment of the present invention.

FIG. 1 is a flow chart for explaining a method of making payment with discounted price based on a location by using temporary card numbers according to an embodiment of the present invention.

A mobile terminal 100 requests a location information system 200 for information on a location of the mobile terminal 100 and receives information on a current location of the mobile terminal 100 from the location information system 200.

The information of the current location of the mobile terminal 100 can be obtained by using a location information service system based on a base station, by using the mobile terminal 100 having a Global Positioning System (GPS) receiver according to a GPS system, or by using a sensor network.

The mobile terminal 100 transmits signals requesting a location-based discount means along with the location information of the mobile terminal 100 to a discount means management device 300. The discount means refers to a medium promising that a predetermined sum is discounted from a predetermined price. For example, the discount means includes coupons, points, mileage, or cyber cash.

The discount means management device 300 comprises a location-based discount means manager 310 and a location-based discount means database 320. The location-based discount means manager 310 retrieves at least one location-based discount means database 320 and detects at least one location-based discount means of at least one store corresponding to the location information received from the mobile terminal 100. For example, the location-based discount means manager 310 retrieves the location-based discount means database 320 and detects discount means available at offline stores located within radius 1 kilometer from the mobile terminal 100. The detected location-based discount means is transmitted back to the mobile terminal 100.

The database of information on offline stores for each region, stored in the location-based discount means database 320, is as follows:

| Region code | Store code | Store contact information | Whether the coupon is valid? |
| --- | --- | --- | --- |
| 1101 | 12134 | 02-345-6789 | Y |

The database of a discount means for each store, stored in the location-based discount means database 320, is as follows:

| Store code | Discount | Valid Period of discount means | Name of discount means | Discounted amount |
| --- | --- | --- | --- | --- |
| 12134 | 45678 | Jan. 1, 2007- Jan. 28, 2007 | Discount 5,000 Korean won at Paris Baguette bakery | 5,000 Korean won |

The discount means received from the discount means management device 300 is displayed on the mobile terminal 100 and a user selects a discount means. Temporary card number issue information including the selected location-based discount means is transmitted to a temporary card number issue device. The temporary card number issue information may include transaction information such as information on a user of the mobile terminal 100.

A temporary card number issue device 400 comprises a temporary card number manager 410 which generates and issues temporary card numbers corresponding to the temporary card number issue information, i.e., a discount means, by using the temporary card number issue information and stores the temporary card numbers in a temporary card number database 420.

The current stores accepting credit cards have a payment system in which sixteen-digits card numbers are transmitted through a credit authorization terminal (CAT) to request card companies for authorization of the card. In order to directly use the payment system without change, temporary card numbers are used.

Information on discounted amount of a discount means is included in a temporary card number management database, and the temporary card number management database is stored in the temporary card number database 420. Then, since the discounted amount can be checked during the settlement based on the temporary card number management database, the discount can be applied only by using the temporary card numbers at the payment stage.

The temporary card numbers are imaginary numbers that can be used only for a limited time period, and these numbers are finally transmitted from the mobile terminal 100 to a credit authorization terminal (CAT).

The temporary card number manager 410 of the temporary card number issue device 400 in advance generates temporary card numbers valid for each discount means as below and selects temporary card numbers corresponding to the temporary card number information, i.e., a discount means, whenever the temporary card number issuance information is received from the mobile terminal 100, so as to configure and store the temporary card number management data base:

| Temporary card numbers | Codes of discount means |
| --- | --- |
| 2342576 | 45678 |
| 234577 | 45679 |

Preferable temporary card number management database is as below:

However, if no payment request is selected during a predetermined time period, for example 10 to 30 minutes, after the temporary card numbers are received, the temporary card numbers are deleted and become invalid.

When authorizing the transaction, the payment company server, i.e., a credit card company, determines based on the temporary card numbers whether the transaction should be authorized and reduces the discounted amount from the total amount to make settlement. In other words, the payment company server can determine whether the temporary card numbers are valid to authorize them.

Since the temporary card number issue device 400 is interlocked with the payment company server 600 when the temporary card numbers are initially generated, the payment company server 600 can know a discount means certain corresponding to temporary card numbers. Thus, since the discount information can be immediately checked when the temporary card numbers are authorized, the authorization for paying the remainder reducing the discounted amount can be immediately performed by a payment means such as credit cards included in the payment information.

If the payment company server 600 transmits the payment information including the transaction authorization information and the discounted amount information to the CAT 500 of stores, the CAT 500 transmits the payment information including the discounted amount information to the mobile terminal 100. The payment information including the discounted amount information can be used in issuing receipts, if necessary, or making settlement later.

Since a communication between the CAT and the payment company server is performed by using the temporary card numbers, a communication network of [stores accepting credit cards—POS—(VAN)—credit card company server] can be directly used.

In order to transmit the temporary card numbers from the mobile terminal 100 to the CAT of the stores, the temporary card numbers may be stored in a memory, i.e., a temporary card number storing part 150, of the mobile terminal 100 and transmitted through a near field communication (NFC).

Figure 2:
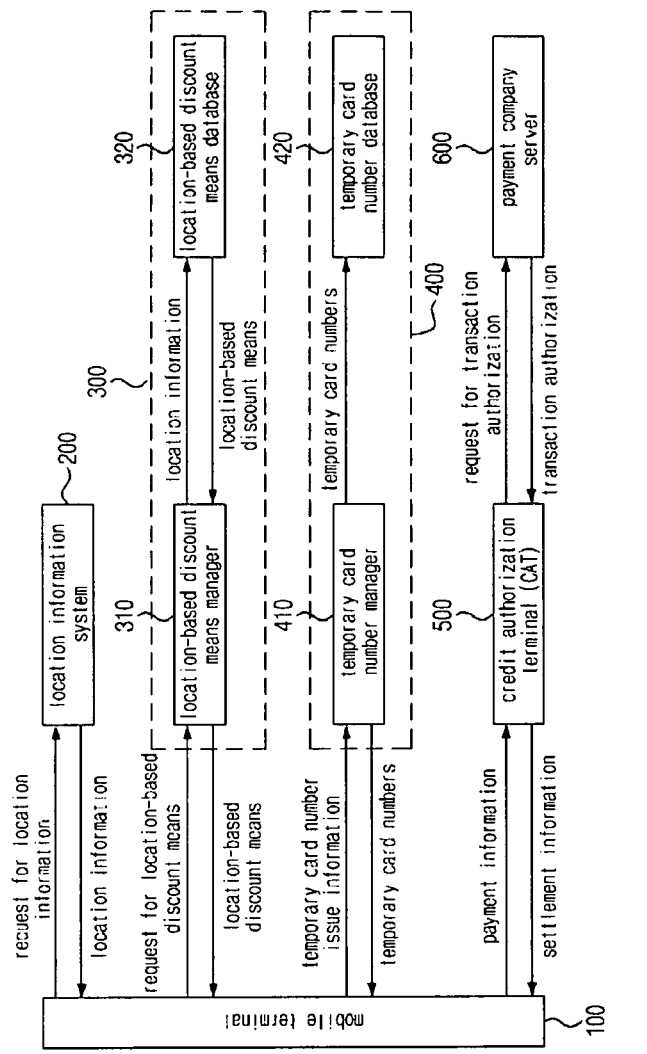
FIG. 2 is a block diagram of a system for making payment with discounted price based on a location by using temporary card numbers.

FIG. 2 illustrates a system for making payment with discounted prices by using temporary card numbers according to an embodiment of the present invention. Referring to FIG. 2, the system comprises a mobile terminal 100, a location information system 200, a discount means management device 300, a temporary card number issue device 400, a credit authorization terminal (CAT) 500, and a payment company server 600.

Hereinafter, the explanation of portions overlapping with the aforementioned embodiment will be omitted, and only the portions, which should be additionally explained, will be explained.

The discount means management device 300 comprises a location-based discount means manager 310 and a location-

| Temporary card number | Discount means codes | User telephone numbers | Resident registration numbers | Discounted amounts | Transacted amounts | Transaction date | Store codes |
| --- | --- | --- | --- | --- | --- | --- | --- |
| 2342576 | 45678 | 01112345678 | 897738394353 | 10000 | 300000 | 2007 Feb. 22 | 12134 |
| 234577 | 45679 | ... | ... | ... | ... | ... | ... |

A user of the mobile terminal 100 receiving the temporary card numbers determines in a predetermined time period whether the payment should be performed and selects a payment request. In this case, the mobile terminal 100 configures the temporary card numbers along with information on payment means such as credit card numbers into payment information and transmits the payment information to the credit authorization terminal (CAT) 500.

based discount means database 320, and retrieves and detects the discount means from the location-based discount means database 320 by using the location information of the mobile terminal. As explained above, the database of information on stores for each region and the database of a discount means for each store are stored in the location-based discount means database 320.

The mobile terminal receiving the location-based discount means selects a location-based discount means and configures temporary card number issue information to transmit the temporary card number issue information to the temporary card number issue device 400 and get temporary card numbers. The temporary card number issue device 400 comprises a temporary card number manager 410 and a temporary card number database 420. The temporary card number manager 410 generates temporary card numbers to transmit these numbers to the temporary card number database 420, and as explained above, the temporary card number management database is stored to include the user information and the discounted amount in the temporary card number database 420.

Figure 3:
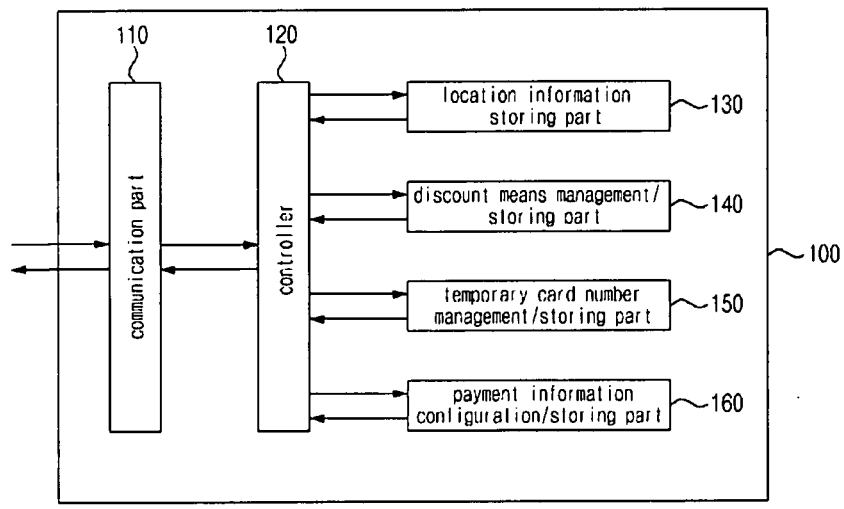
FIG. 3 is a block diagram of a mobile terminal configuring a system for making payment with discounted price based on a location by using temporary card numbers according to an embodiment of the present invention.

FIG. 3 illustrates a mobile terminal 100 according to an embodiment of the present invention. Referring to FIG. 3, the mobile terminal 100 comprises a communication part 110, a controller 120, a location information storing part 130, a discount means management/storing part 140, a temporary card number management/storing part 150, and a payment information configuration/storing part 160. The location information storage 130 receives and stores location information from the location information system 200, the discount means management/storing part 140 receives and stores the location-based discount means, the temporary card number management/storing part 150 receives and stores the temporary card numbers, and the payment information configuration/storing part 160 deletes the temporary card numbers if no payment request is received from a user within a predetermined time period and configures the payment information by using the payment means information such as credit card information and the temporary card numbers if any payment request is received from a user within a predetermined time period.

Effect of the Invention

According to the present invention, a consumer does not need to always store and carry coupons, which are related to offline stores and not determined as to whether they will be used or not, and instead, a consumer can easily obtain coupons, which can be used often, based on a location and immediately use the coupons. In addition, the present invention can save time delayed due to the complicated procedures to make payment with discounted prices by using coupons, so more convenient payment can be made.

Meanwhile, since coupons are effectively issued, a businessman of offline stores can reduce the waste caused by the overissuing of coupons. In addition, since additional devices for applying discounts such as additional coupons are not required, payment can be made by using coupons with almost no additional costs.

While the invention has been shown and described with reference to certain embodiments thereof, it will be understood by those skilled in the art that various changes in form and details may be made therein without departing from the spirit and scope of the invention as defined by the appended claims.

The invention claimed is:

1. A method for making payment with discounted prices by using temporary card numbers, the method comprising the steps of:
   (a) at least one discount medium and discount location being selected by a user of a mobile terminal;
   (b) using the terminal to determine the geographical location of the mobile terminal at the time of the selection of the discount medium, the discount location and the discount amount to be applied to a transacted price in a given geographical region within which the mobile terminal is currently located at the time of the selection;
   (c) transmitting from said mobile terminal temporary card number issue information to a temporary card number issue device with said temporary card number issue information including at least the discount location, selected discount medium discount amount, and the payment medium of the user to be used in payment of the transacted price;
   (d) using the temporary card number issue device for generating a temporary card number corresponding to the temporary card number issue information and transmitting the generated temporary card number to the mobile terminal;
   (e) the mobile terminal transmitting to a credit authorization terminal (CAT) the generated temporary card number along with the temporary card number issue information including the discount location and discount amount and the payment medium of the user to be used in payment of the transacted price less a calculated discount based upon the temporary card number issue information;
   (f) determining prior to step (e) if the user has made a payment request within a predetermined time period from when the temporary card number was generated, and extinguishing the temporary card number after the predetermined time period expires if the user has not timely made a payment request; and
   (g) using the CAT to request transaction authorization to approve payment of the transacted price less the calculated discount based upon use of the temporary card number when the user has made a payment request within the predetermined time period.

2. The method according to claim 1, wherein the discount medium comprises coupons, points, mileage, and cyber cash.

3. The method according to claim 1, wherein the temporary card number issue information comprises the selected discount medium discount amount, and the payment medium of the user to be used in payment of the transacted price less the discount amount,
   wherein the temporary card number management database, which the temporary card number issue device includes, comprises temporary card numbers, telephone numbers of the user, residence registration numbers, a discounted amount, a payment amount, a transaction date, a store code, and a discount code.

4. The method according to claim 1, wherein the payment medium comprises a credit card, a debit card, and electronic money.

5. The method according to claim 1, wherein in the step of (d), the CAT further receives settlement information including discount information, in addition to the transaction authorization from the payment company server.

6. A system for making payment with discounted prices by using temporary card numbers, the system comprising:
   a mobile terminal which a consumer uses;
   a temporary card number issue device for issuing temporary card numbers;
   a credit authorization terminal (CAT) which a seller uses; and
   a payment company server for performing a transaction authorization,
   wherein at least one discount medium is selected by the user of the mobile terminal, the mobile terminal in advance storing a plurality of discount mediums that can substantially discount a transacted price, and the mobile terminal transmits temporary card number issue information including the selected discount medium discount amount, and the payment medium of the user to be used in payment of the transacted price less the discount amount to the temporary card number issue device, receives the temporary card numbers from the temporary card number issue device, transmits payment information including the temporary card numbers and payment information including information on a payment medium for paying the transacted price to a credit authorization terminal (CAT) if a payment request is received from the user only for a predetermined time period from when the temporary card numbers are received, and extinguishes the temporary card numbers after the predetermined time period from when the temporary card numbers are received, wherein the temporary card number issue device generates a temporary card number corresponding to the temporary card number issue information, and transmits the generated temporary card number to the mobile terminal, and wherein the CAT receives the payment information from the mobile terminal, transmits a request for a transaction authorization to approve the payment of the transacted price less a calculated discount based upon the temporary card number issue information and receipt of the payment request by the user within the predetermined time period.

7. The system according to claim 6, wherein the discount medium comprises coupons, points, mileage, and cyber cash.

8. The system according to claim 6, wherein the payment medium comprises a credit card, a debit card, and electronic money.

9. The system according to claim 6, wherein the temporary card number issue information comprises the selected discount means, information on a user of the mobile terminal, and transaction information, wherein a temporary card number management database which the temporary card number issue device includes comprises temporary card numbers, telephone numbers of the user, residence registration numbers, the discounted amount, a payment amount, transaction date, store code, and discount code.

10. The system according to claim 6, wherein the CAT further receives the settlement information including discount information in addition to the transaction authorization from the payment company server.

* * * * *